(12) United States Patent
Glaser

(10) Patent No.: US 8,100,459 B2
(45) Date of Patent: Jan. 24, 2012

(54) SUN VISOR DEVICE FOR THE WINDOW OF A MOTOR VEHICLE

(75) Inventor: Carsten Glaser, Mühltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 12/427,501

(22) Filed: Apr. 21, 2009

(65) Prior Publication Data

US 2009/0267379 A1 Oct. 29, 2009

(30) Foreign Application Priority Data

Apr. 24, 2008 (DE) .................. 10 2008 020 541

(51) Int. Cl.
*B60J 7/00* (2006.01)
(52) U.S. Cl. .................. 296/97.8; 160/370.22; 296/97.4
(58) Field of Classification Search ................ 296/97.4, 296/97.8, 97.11, 97.9, 98, 26.09; 160/370.22
See application file for complete search history.

(56) References Cited

U.S. PATENT DOCUMENTS

| | | | |
|---|---|---|---|
| 6,428,088 B1 | 8/2002 | Castonguay et al. | |
| 7,171,112 B2 | 1/2007 | Selvini et al. | |
| 7,237,817 B2* | 7/2007 | Kobylski et al. | 296/26.09 |
| 2004/0160082 A1* | 8/2004 | Bohm et al. | 296/97.11 |
| 2005/0200155 A1 | 9/2005 | Asai | |
| 2006/0118254 A1 | 6/2006 | Thumm | |
| 2009/0020236 A1 | 1/2009 | Hansen | |
| 2009/0072574 A1* | 3/2009 | Tominaga et al. | 296/97.4 |

FOREIGN PATENT DOCUMENTS

| | | |
|---|---|---|
| DE | 3603852 A1 | 8/1987 |
| DE | 19917292 A1 | 10/2000 |
| DE | 10007657 A1 | 9/2001 |
| DE | 10306733 A1 | 9/2004 |
| DE | 102005056332 A1 | 5/2007 |
| EP | 1112876 A2 | 7/2001 |
| EP | 1 201 473 A2 * | 9/2001 |
| EP | 1153780 A2 | 11/2001 |
| EP | 1547836 A2 | 6/2005 |

OTHER PUBLICATIONS

British Patent Office, British Search Report for Application No. 0906817.2, dated Jul. 23, 2009.

* cited by examiner

*Primary Examiner* — Joseph Pape
(74) *Attorney, Agent, or Firm* — Ingrassia Fisher & Lorenz, P.C.

(57) ABSTRACT

A sun visor device is provided for the window of a motor vehicle with a cover that can be moved in a first direction and in an opposite second direction. A locking mechanism is also provided for locking the cover in different positions.

17 Claims, 3 Drawing Sheets

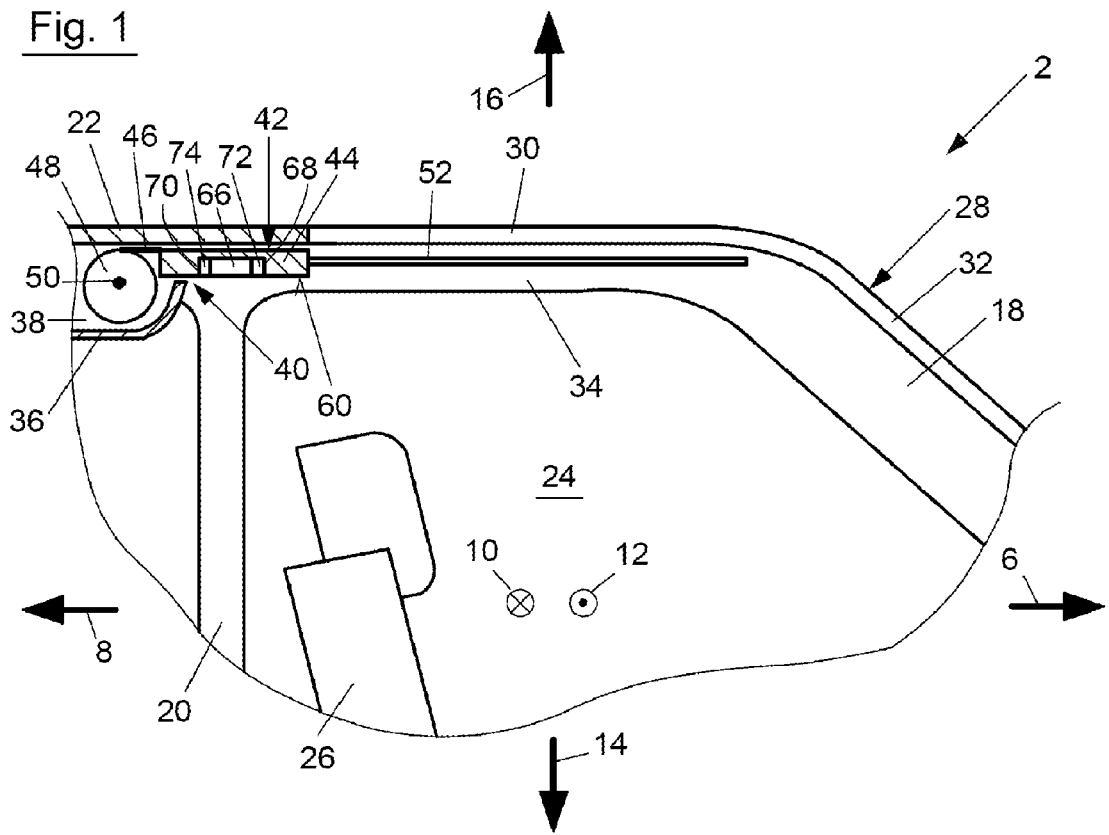
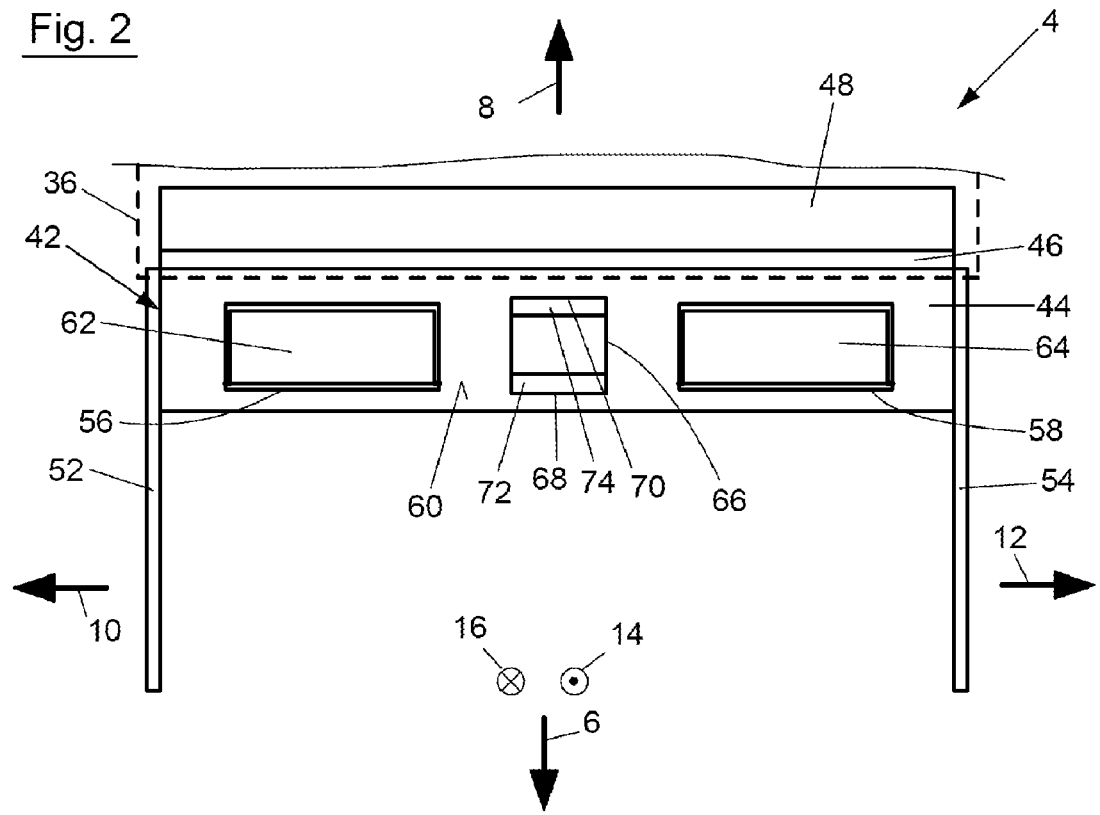

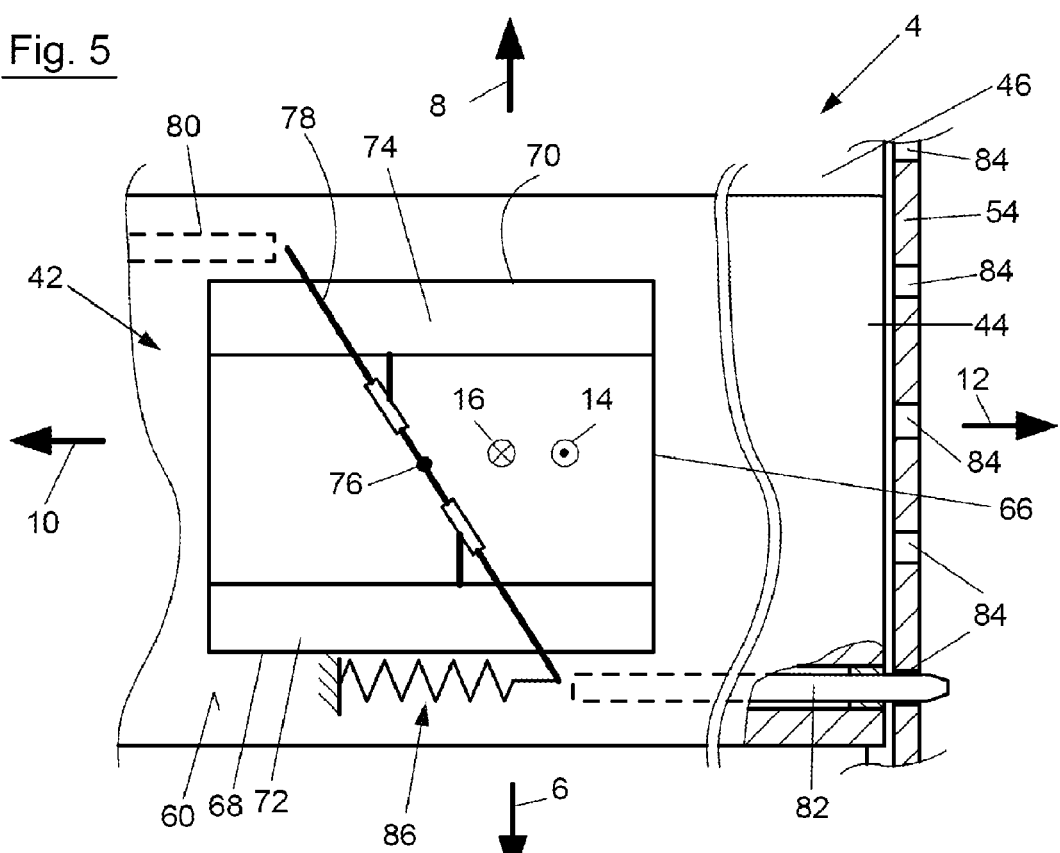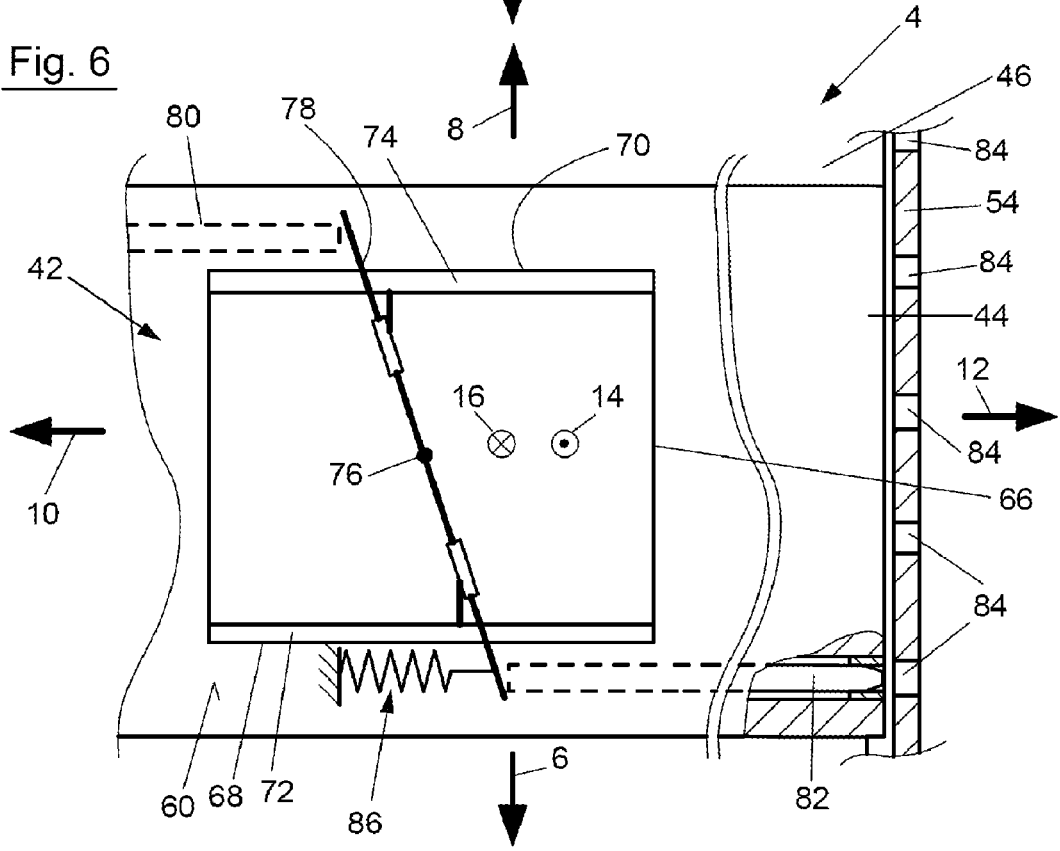

SUN VISOR DEVICE FOR THE WINDOW OF A MOTOR VEHICLE

CROSS-REFERENCE TO RELATED APPLICATION

This application claims priority to German Patent Application No. 102008020541.9, filed Apr. 24, 2008, which is incorporated herein by reference in its entirety.

TECHNICAL FIELD

The invention relates to a sun visor device for the window of a motor vehicle with a cover which can be moved in a first direction and in an opposite second direction. The present invention relates further to a motor vehicle with such a sun visor device.

BACKGROUND

From the prior art, motor vehicles with a window are known which have a sun visor device for this window. Thus, in particular, motor vehicles are known with sun visor devices for a roof-side window, a windshield, or a panorama window. The sun visor devices typically have a cover which is formed either as a rigid plate or as a flexible tarp which can be pulled out from a roller blind. For this, the cover of the known sun visor devices can be moved in a first direction and in an opposite second direction to either prevent the solar radiation through the window or to uncover the window so that light can get through the window into the vehicle interior.

The known sun visor devices have proven themselves; however, they have the disadvantage that the covers pose an increased risk of injury when a crash of the motor vehicle takes place. Thus, in the event of a collision, due to the inertial forces, the cover tends to spring forwards, backwards, or to the side so that a collision with the vehicle passenger can not be excluded. Furthermore, the handling of the cover in the known sun visor devices is limited in such a manner that a flexible regulation of the solar radiation passing through the window is not possible.

It is hence at least one object of the present invention to provide a sun visor device for the window of a motor vehicle with a cover which poses a lower risk of injury in the event of a crash, and further, a flexible and simple handling of the cover of the sun visor device should be possible. The present invention is further based on the object to provide a motor vehicle with such an advantageous sun visor device. In addition, other objects, desirable features and characteristics, will become apparent from the subsequent detailed description, and the appended claims, taken in conjunction with the accompanying drawings and this background

SUMMARY

The sun visor device according to an embodiment of the invention is designed for the window of a motor vehicle such as, for example, a roof-side window, a windshield, or a panorama window, and has a cover. The cover can be moved or displaced in a first direction and in an opposite second direction. A locking mechanism for locking the cover in different positions is also provided.

While the covers of conventional sun visor devices can be locked or secured, respectively, only in one position, namely in the end position, in which the window is completely covered by the cover, the locking mechanism allows a locking of the cover in different positions. Thus, the cover can be locked not only in an end position, in which the window is completely covered, but also in other positions, in particular in intermediate positions, in which the window is covered only partially by the cover so that the incidence of light through the window can be regulated particularly simple by means of the cover. Furthermore, the locking in the different positions of the cover causes that the cover does not spring unintentionally during an accident or crash, respectively, into the first or second direction so that the risk of injury posed by the cover during an accident is substantially lower.

To allow a particularly flexible regulation of the incidence of light through the window, in an advantageous embodiment of the sun visor device according to the invention, the locking mechanism is formed in such a manner that the cover can be locked in at least two, preferably at least three different positions.

According to an advantageous embodiment of the sun visor device according to the invention, the locking mechanism can be brought from a closed setting, in which the cover can not be moved into the first and second direction, into an open setting, in which the cover can be moved in at least one, preferably in both of the first and the second directions.

To allow a particularly safe locking of the cover, regardless if the vehicle passenger has actuated the locking mechanism, in a particularly advantageous embodiment of the sun visor device according to the invention, the locking mechanism is preloaded into the closed setting. For this purpose, for example, a simple spring element can be provided. With this embodiment, the cover is hence automatically locked by the locking mechanism without the need for the vehicle passenger to act.

To combine manually moving the cover and the actuation of the locking mechanism in an advantageous manner, in a particularly preferred embodiment of the sun visor device according to the invention, the locking mechanism is arranged at the cover. Thus, the vehicle passenger can take the cover to release and move it at the same time, whereby the handling of the cover is considerably simplified.

To further enhance the above mentioned advantage and to achieve a particularly compact structure of the sun visor device, in a further preferred embodiment of the sun visor device according to the invention, an actuating device for the locking mechanism is provided at the cover. The actuating device can include, for example, one or more actuating means in the form of levers, switches, buttons, etc.

In a particularly advantageous embodiment of the sun visor device according to the invention, the actuating device has a single actuating means which can be moved in the first and second direction from a closed position, in which the locking mechanism is brought into the closed setting, into an open position, in which the locking mechanism is brought into the open setting. If the vehicle passenger wants to move the cover, for example, in the first direction, he/she only has to take this single actuating means and move it in the first direction from the closed position into the open position so that the locking mechanism is brought into the open setting. If the vehicle passenger pushes the single actuating means further in the first direction after the locking mechanism has been brought into the open setting, then the cover can subsequently be moved in the first direction as well by means of the actuating means. On the other hand, the vehicle passenger can bring the locking mechanism into the open setting and can move the cover in the opposite second direction by moving the single actuating means in the second direction. Hereby, the actuating device is structured particularly compact and allows a particularly intuitive operation by the vehicle passenger.

In a further particularly preferred embodiment of the sun visor device according to the invention, the actuating device has not only a single actuating means, but, in fact, a first and a second actuating element. With this, the first actuating means can be moved in the first direction from a closed position, in which the locking mechanism is brought into the closed setting, into an open position, in which the locking mechanism is brought into the open setting. The second actuating means can be moved in the second direction from a closed position, in which the locking mechanism is brought into the closed setting, into an open position, in which the locking mechanism is brought into the open setting. In this embodiment, the actuating device has indeed a more complex structure; however, the two-piece actuating device allows an arrangement of the two actuating means which can be operated relative to one another and independently from one another in a particularly intuitive manner.

Based on the aforementioned embodiment, in a further preferred embodiment of the sun visor according to the invention, the first actuating means is hence arranged in the first direction before or behind the second actuating means. Thus, for example, the arrangement of the first actuating means in the first direction before the second actuating means is recommended when both actuating means are arranged on a common projection at the cover. On the other hand, an arrangement of the first actuating means in the first direction behind the second actuating means is recommended when the two actuating means are arranged within a recessed grip or a cut-out, respectively, or an indentation in the cover, as this is the case in embodiment described below.

In a further particularly advantageous embodiment of the sun visor device according to the invention, the single actuating means is, or the first and the second actuating means are, arranged within a recessed grip in the cover, and the first actuating means is preferably arranged in the first direction behind the second actuating means. Thus, the vehicle passenger can reach into the recessed grip to move the cover in the first or the second direction. In the first mentioned case, the first actuating means would move in the first direction to bring the locking mechanism into the open setting and to displace or move subsequently the cover together with the actuating device in the first direction. Conversely, the vehicle passenger would first reach into the recessed grip to move the second actuating means in the second direction so that the locking mechanism is released and to move subsequently the cover itself in the second direction. With this embodiment, hence, a particularly simple and intuitive handling of the cover of the sun visor device is possible.

In order that the vehicle passenger can reach particularly easily into the recessed grip, in a further embodiment of the sun visor device according to the invention, the first actuating means is arranged at the recessed grip edge located in the first direction and the second actuating means is arranged at the recessed grip edge located in the second direction. Hence, the vehicle passenger can reach particularly easily between the two actuating means, and displacing the cover is possible by applying pressure on the respective actuating means.

To further reduce for the vehicle passenger the risk of injury posed by the sun visor device, in a further advantageous embodiment of the sun visor device according to the invention, the cover has an inner side facing towards the vehicle interior, and the single actuating means, or the first actuating means and the second actuating means, are arranged flush or are set back with respect to the inner side within the recessed grip. In this manner, not only the risk of injury by unintended hitting against the actuating means is reduced, but it is, in fact, also ensured that the single actuating means, or the first and/or the second actuating means, are not actuated unintentionally. Moreover, an actuating device integrated in such a manner in the cover allows a particularly compact structure of the cover so that the actuating device can be brought in a particularly simple manner into a non-use position such as, for example, within a receiving space between a roof liner and the vehicle roof. A collision of the actuating means with other components of the vehicle within the vehicle interior is hence widely eliminated.

According to a further advantageous embodiment of the sun visor device according to the invention, the movements of the first and the second actuating means are coupled with each other, preferably by means of the locking mechanism, in such a manner that upon actuation of only one of the actuating means, the one actuating means moves simultaneously with the other actuating means into the open position or closed position.

According to a further preferred embodiment of the sun visor device according to the invention, the actuating device or its actuating means, respectively, are preloaded into the closed position. In the same manner as for the locking mechanism, this preload can be caused by means of a spring element. Preferably, the actuating device is coupled with the locking mechanism in such a manner that the actuating device, by means of the preload of the locking mechanism in its closed setting, is preloaded into the closed position. Hereby, a considerably simpler structure can be achieved since fewer springs are needed to preload the locking mechanism in the closed setting as well as the actuating device into the closed position.

In a further preferred embodiment of the sun visor device according to the invention, further, two opposing guide rails are provided in which the cover is displaceably guided in the first and second direction.

According to a further preferred embodiment of the sun visor device according to the invention, the locking mechanism has at least one moveable lock which is arranged in the closed setting of the locking mechanism in a cut-out or indentation in one of the guide rails and, in the open setting, is not arranged in the cut-out or indentation.

In a further advantageous embodiment of the sun visor device according to the invention, the lock can be longitudinally displaced. Thus, the lock can be formed by a longitudinally displaceable rod or a longitudinally displaceable bolt.

To be able to attach the locking mechanism in a particularly space-saving manner at the cover, in a further preferred embodiment of the sun visor device according to the invention, the locking mechanism has a pivoting lever which preferably can be pivoted about a vertical axis of the cover and which is pivotable by means of the actuating device or the actuating means, respectively, and which is coupled with the longitudinally displaceable lock in such a manner that the pivoting movement of the pivoting lever causes a longitudinal displacement of the lock.

In a further particularly preferred embodiment of the sun visor according to the invention, the cover has a rigid, preferably plate-shaped support member on which the locking mechanism and the actuating device are arranged, and a preferably flexible tarp which can be pulled out and which is mounted to the support member. Thus, on the one hand, the support member allows a secure receiving of the locking mechanism and the actuating device and, on the other hand, the pull-out tarp allows a space-saving arrangement of the cover in a non-use position. Thus, in the non-use position, the pull-out tarp can be rolled-up on a roller blind which is arranged between a roof liner and the vehicle roof.

The motor vehicle according to the invention has a sun visor device of the above described type according to the invention. With respect to the advantages of the motor vehicle with such a sun visor device, reference is made to the above described advantages of the sun visor device according to an embodiment of the invention.

In a preferred embodiment of the motor vehicle according to the invention, the sun visor device is arranged in such a manner that a roof-side window, a windshield, and/or a panorama window of the motor vehicle can be covered by the cover, and the panorama window preferably has a roof-side window section and a front window section.

BRIEF DESCRIPTION OF THE DRAWINGS

The present invention will hereinafter be described in conjunction with the following drawing figures, wherein like numerals denote like elements, and:

FIG. 1 shows a partial side view of a motor vehicle with an embodiment of the sun visor device according to the invention in a sectional illustration, with the cover in a non-use position;

FIG. 2 shows a bottom view of the sun visor device of FIG. 1;

FIG. 5 shows a schematic partial view of the sun visor device of FIG. 2 and FIG. 4, with the locking mechanism in the closed setting; and FIG. 6 shows the partial view of FIG. 5 with the locking mechanism in the open setting.

DETAILED DESCRIPTION

Figure 3:
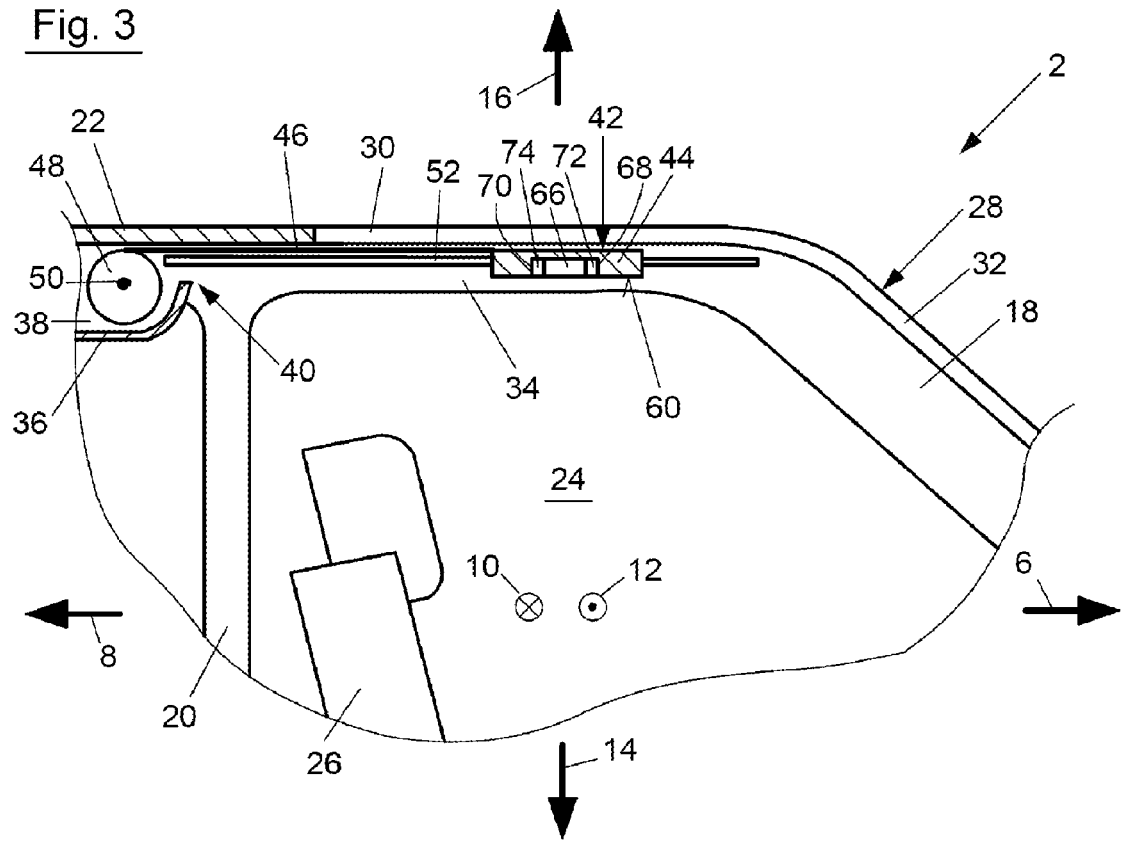
FIG. 3 shows the motor vehicle of FIG. 1 with the cover in a use position.
Figure 4:
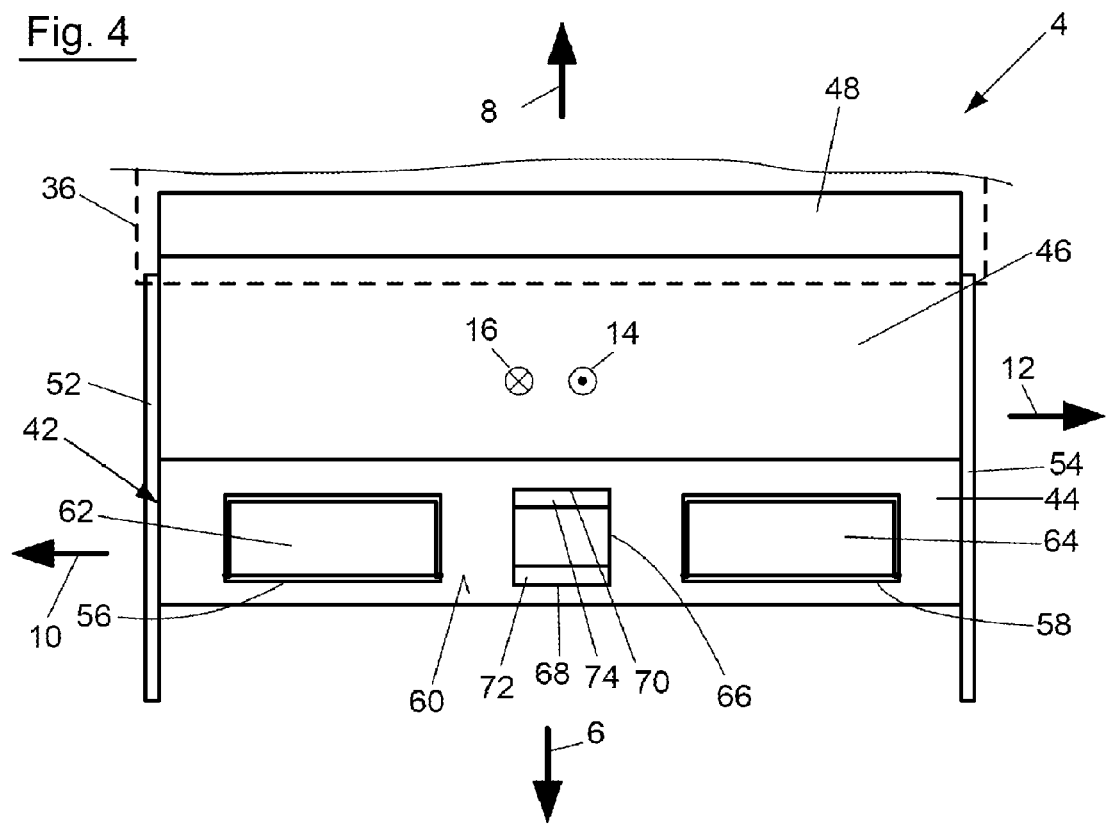
FIG. 4 shows a bottom view of the sun visor device of FIG. 3.

The following detailed description is merely exemplary in nature and is not intended to limit application and uses. Furthermore, there is no intention to be bound by any theory presented in the preceding background and summary or the following detailed description.

FIG. 1 shows a cross-section of a motor vehicle 2 with a sun visor device 4 which is shown in more detail in FIG. 2. The forward direction of the motor vehicle 2 is indicated in FIGS. 1 and 2 by means of the arrow 6, while the reverse direction is shown by means of the arrow 8. Further, the transverse directions of the motor vehicle 2 are indicated by means of the arrows 10 and 12, while the vertical directions are shown by means of the arrows 14 and 16. The motor vehicle 2 has a body which, among other things, has two A-pillars 18 spaced apart from one another in transverse direction 10 or 12, respectively, and two B-pillars 20 spaced apart from one another in transverse direction 10 or 12, respectively, of which in FIG. 1 only one of each is shown. Here, the B-pillar 20 is arranged in reverse direction 8 behind the A-pillar 18. Further, the body has a vehicle roof 22 which borders the vehicle interior 24 in a rear area in vertical direction 16 upwards. Further shown in FIG. 1 is the seat back of a motor vehicle seat 26 which is arranged in a front area of the vehicle interior 24 in the first seat row of the motor vehicle 2.

In that area of the vehicle interior 24 in which the vehicle seat 26 or the whole front seat row, respectively, is arranged, the vehicle interior 24 is bordered in vertical direction 16 and in forward direction 6 by a panorama window 28. The panorama window 28 comprises a roof-side window section 30 which, in reverse direction 8, follows the vehicle roof 22, and window section 32 forming a windshield. While the roof-side window section 30 extends in forward or reverse direction 6 or 8, respectively, between the B-pillar 20 and the A-pillar 18, the front window section 32 runs along the A-pillar 18 to a not-shown instrument panel. In the transverse directions 10 or 12, respectively, the panorama window 28 extends from a roof frame 34 to an opposite, not-shown roof frame or from the A-pillar 18 to the opposite A-pillar, respectively, so that the vehicle passengers have a panorama view through the panorama window 28.

In vertical direction 14 below the vehicle roof 22, a roof liner 36 is arranged. Here, the roof liner 36 is arranged between the roof liner's 36 side facing in vertical direction 16 and the vehicle roof's 22 side facing in vertical direction 14, thereby forming a receiving space 38. The receiving space 38 is accessible through a gap 40 which faces in forward direction and which is formed between the roof liner 36, on the one hand, and the vehicle roof 22, on the other hand, and extends continuously in transverse direction 10 or 12, respectively.

Hereinafter, the structure of the sun visor device 4 is described in more detail with reference to FIG. 1 and FIG. 2. The sun visor device 4 has a cover 42. The cover 42 comprises a rigid, plate-shaped support member 44 and a flexible tarp 46, and the tarp 46 is attached to the support member 44. The tarp 46 can be pulled out from a roller blind 48 which can be rotated about a rotational axis 50 extending in transverse direction 10 or 12, respectively. For this, the roller blind 48 is arranged within the receiving space 38 between the roof liner 36, on the one hand, and the vehicle roof 22, on the other hand. Thus, the tarp 46 and a part of the support member 44 can be pulled through the gap 40 out of the receiving space 38 into the vehicle interior 24.

For the cover 42, further, two opposing guide rails 52, 54 are provided which extend along the roof frame 34, wherein in FIG. 1 only the guide rail 52 is shown. Thus, the cover 42 is laterally guided with its edges facing in the transverse directions 10 and 12 within the guide rails 52, 54 so that the cover 42 can be displaced in a first direction which, in the present embodiment, corresponds to the forward direction 6, and in an opposite second direction which, in the present embodiment, corresponds to the reverse direction 8.

The plate-shaped support member 44 further has two receptacles 56, 58 in the inner side 60 facing the vehicle interior 24. Within each of the receptacles 56, 58, one pivotable sun shield 62, 64 is arranged, as shown in FIG. 2. Moreover, on the inner side 60 of the support member, a central recessed grip 66 is provided into which the vehicle passenger can reach to displace the cover 42 in the first or the second direction 6, 8. In the present embodiment, the recessed grip 66 is formed as an indentation within the inner side 60, alternatively, this recessed grip 66 could also be formed as a cut-out within the support member 44. The recessed grip 66 in the form of an indentation has a front edge 68 located in the first direction 6 and a rear edge 70 located in the second direction 8.

Within the recessed grip 66, an actuating device is arranged which is composed of a first actuating means 72 and a second actuating means 74. The actuating device consisting of the actuating means 72, 74 serves for the actuation of the locking mechanism for locking the cover 42 in different positions with respect to the first or the second direction 6, 8, respectively, and the locking mechanism as well as the actuating device is arranged at the support member 44 of the cover 42 and is to be described later in more detail with reference to the FIG. 5 and FIG. 6. The first as well as the second actuating means 72, 74 is arranged flush with the inner side 60 of the support member 44 so that they do not project into the vehicle interior 24 in an disturbing manner. Alternatively, the first and the second actuating means 72, 74 can also be arranged set back with respect to the inner side 60 of the support member 44 within the recessed grip 66. The first actuating means 72 is arranged in the first direction 6 behind the second actuating means 74 at the front edge 68 of the recessed grip 66. The second actuating means 74, however, is arranged at the rear edge 70 of the recessed grip 66, and the first actuating means 72 is spaced apart from the second actuating means 74.

The first actuating means 72 can be moved or pushed, respectively, in the first direction 6 relative to the support member 44 from the closed position, shown in FIG. 1 to FIG. 5, into an open position, shown in FIG. 6. In contrast, the second actuating means 74 can be moved or displaced, respectively, from the closed position, shown in FIG. 1 to FIG. 5, in the second direction 8 relative to the support member 44 into an open position which is also shown in FIG. 6. When the first and/or the second actuating means 72, 74 are in the closed position, the locking mechanism of the cover 42 is brought in a closed setting, while the locking mechanism of the cover 42 is brought in an open setting when the first and/or the second actuating means 72, 74 are in the open position, and hereinafter first the structure of the locking mechanism is to be described with reference to the FIG. 5 and FIG. 6.

As is shown in the FIG. 5 and FIG. 6, the locking mechanism at the support member 44 has first a pivoting lever 78 which can be pivoted about a vertical axis 76 and which is coupled with the actuating means 72, 74 in such a manner that the pivoting lever 78 is rotated about the vertical axis 76 when one of the actuating means 72, 74 is moved from the closed position into the open position or vice versa. The pivoting lever 78 is coupled with each of its ends to rod-shaped, longitudinally displaceable locks 80, 82 so that the pivoting movement of the pivoting lever 78 causes a longitudinal displacement of the locks 80, 82. In the closed setting of the locking mechanism, in which the cover 42 can not be displaced in the first and second direction 6, 8, the locks 80, 82 extend in transverse direction 10 or 12, respectively, beyond the edge of the support member 44, and are arranged in one of a plurality of cut-outs 84 within the guide rails 52, 54. Here, the locking mechanism is preloaded into the closed setting, shown in FIG. 5, by means of a spring element 86 which is engaged with the pivoting lever 78. Moreover, the spring element 86 causes a preload of the actuating means 72, 74 into their closed position. Furthermore, the movements of the first and the second actuating means 72, 74 are coupled with each other by means of the pivoting lever 78 of the locking mechanism in such a manner that, upon actuation of only one of the actuating means 72, 74, the one actuating means 72, 74 is moved simultaneously with the other actuating means 74, 72 into the open or closed position.

If the vehicle passenger wants to bring the cover 42 from the position shown in FIG. 1 in the first direction 6 into the position shown in FIG. 3, he/she has to proceed as follows. First, the vehicle passenger, preferably the vehicle passenger on the vehicle seat 26, reaches into the recessed grip 66 and applies pressure on the first actuating means 72 in the first direction 6. Hereby, the first actuating means 72 is moved from the closed position, shown in FIG. 5, in the first direction 6 into the open position, shown in FIG. 6. Hereby, the pivoting lever 78 of the locking mechanism is rotated about the vertical axis 76 against the preload of the spring element 86, and the longitudinally displaceable locks 80, 82, which are coupled with the pivoting lever 78, are displaced in the transverse direction 10 or 12, respectively, in such a manner that the locks 80, 82 are not arranged anymore within the cut-outs 84 in the guide rails 52, 54, as is shown in FIG. 6. The locking mechanism is now in an open setting in which a displacement of the cover 42 in the first or second direction 6, 8 is possible again. Thus, if the vehicle passenger continues to apply pressure on the first actuating means 72 in the first direction 6, this results in that now the cover 42 can also be pulled in the first direction 6 into a position which is shown in the FIG. 3 and FIG. 4. If the vehicle passenger does not apply pressure anymore on the first actuating means 72, the locking mechanism, due to the spring element 86, returns again to the closed setting, shown in FIG. 5, in which the actuating means 72, 74 take their closed position and the locks 80, 82 are arranged again in one of the cut-outs 84. Due to the plurality of cut-outs 84 which are shown in FIG. 5, the cover 42 can be locked in at least two, preferably three different positions. If the cover 42 is not needed anymore, the vehicle passenger can displace it accordingly by applying pressure on the second actuating means 74 in the second direction 8, and the functionality of the locking mechanism corresponds to the functionality described above.

In an alternative embodiment of the sun visor device 4, instead of two actuating means 72, 74, the actuating device can also have only one single actuating means which is moved in the first and second direction 6, 8 from a closed position, in which the locking mechanism is brought in the closed setting, into an open position, in which the locking mechanism is brought in the open setting. Furthermore, for a two-piece actuating device, the first actuating means 72 could also be arranged before the second actuating means 74, and this embodiment is recommended when the two actuating means 72, 74 are not arranged within a recessed grip 66, but, in fact, at a projecting nose provided at the inner side 60 of the support member 44. However, this includes also an embodiment in which the actuating means 72, 74 arranged at the projecting nose are arranged together with the projecting nose within a recessed grip 66 in the support member 44.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A sun visor device for a window of a motor vehicle, comprising:
    a cover which can be moved in a first direction and in a second direction that is substantially opposite to the first direction;
    a locking mechanism adapted to lock the cover in a plurality of different positions; and
    an actuating device for actuating the locking mechanism, the actuating device being connected to the locking mechanism, the actuating device having a first actuator configured for movement in the first direction from a first closed position to a first open position and a second actuator configured for movement in the second direction from a second closed position to a second open position,
    wherein the locking mechanism is moved to an open setting when one of the first actuator and the second actuator is in its respective open position.

2. The sun visor device according to claim 1, wherein the locking mechanism is adapted to lock the cover in at least three different positions of the plurality of different positions.

3. The sun visor device according to claims 1, wherein the locking mechanism is configured for movement from a closed setting, in which the cover can not be moved in the first direction and the second direction, to an open setting, in which the cover can be moved in at least one of the first direct and the second direction.

4. The sun visor device according to claim 3, wherein the locking mechanism is preloaded into the closed setting.

5. The sun visor device according to claim 1, wherein the locking mechanism is arranged at the cover.

6. The sun visor device according to claim 1, further comprising an actuating device for the locking mechanism at the cover.

7. The sun visor device according to claim 1, wherein the first actuator is located behind the second actuator with respect to the first direction.

8. The sun visor device according to claim 7, wherein the first actuator or the second actuator is arranged within a recessed grip in the cover.

9. The sun visor device according to claim 8, wherein the first actuator is arranged at an edge of the recessed grip and the second actuator is arranged at a second edge of the recessed grip.

10. The sun visor device according to claim 8, wherein the cover comprises an inner side facing an interior of the motor vehicle, wherein the first actuator and the second actuator are arranged flush with or set back with respect to the inner side within the recessed grip.

11. The sun visor device according to claims 1, wherein the first actuator and the second actuator are coupled to one another such that movement of the first actuator to the first open position will cause movement of the second actuator to the second open position and vice versa.

12. The sun visor device according to claim 1, wherein the actuating device is preloaded into the closed position with a preload of the locking mechanism.

13. The sun visor device according to claim 1, further comprising a first guide rail opposing a second guide rail, the first guide rail and the second guide rail being configured to guide the cover as the cover moves in the first direction and the second direction.

14. The sun visor device according to claim 13, wherein the locking mechanism comprises at least one moveable lock which, in the closed setting of the locking mechanism, is arranged in an indentation in one of the first guide rail and the second guide rail, and, in the open setting, is not arranged in the indentation.

15. The sun visor device according to claim 14, wherein the at least one moveable lock is longitudinally displaceable.

16. The sun visor device according to claim 15, wherein the locking mechanism comprises a pivoting lever which can be pivoted about a vertical axis and which can be pivoted by an actuating device and is coupled with the at least one moveable lock in such a manner that a pivoting movement of the pivoting lever causes a longitudinal displacement of the at least one moveable lock.

17. The sun visor device according to claim 1, wherein the cover comprises a support member at which the locking mechanism and an actuating device are arranged, and a flexible pull-out tarp that is attached to a support member.

* * * * *